W. McCONWAY.
CAR WHEEL.
APPLICATION FILED NOV. 7, 1908.
929,321.
Patented July 27, 1909.
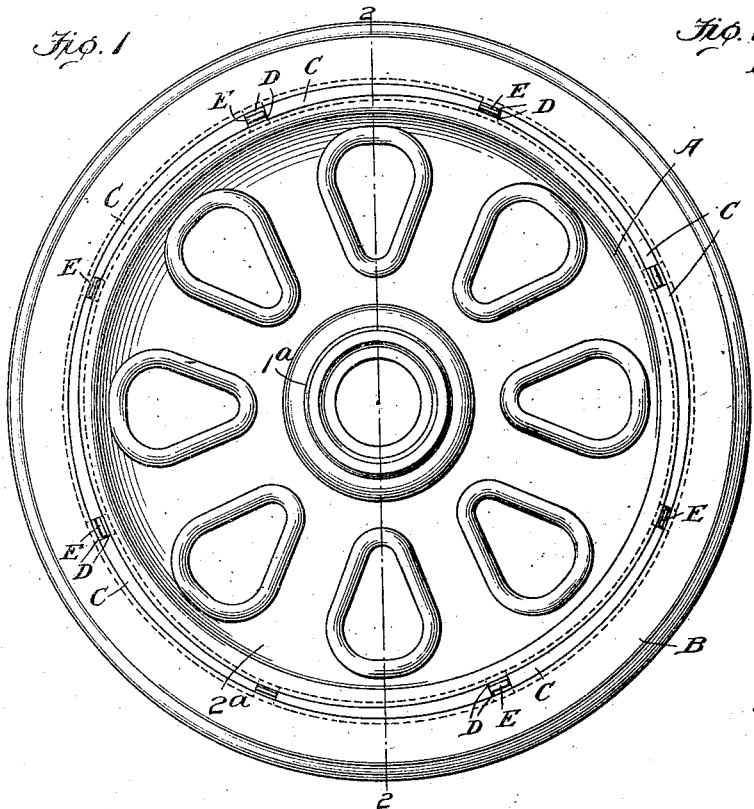
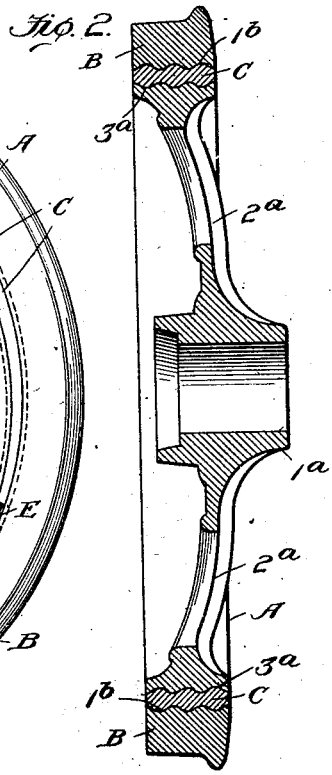
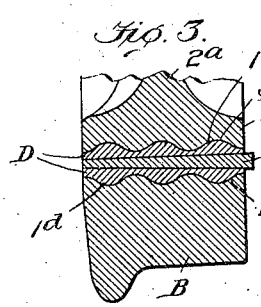
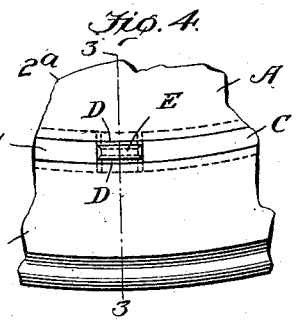
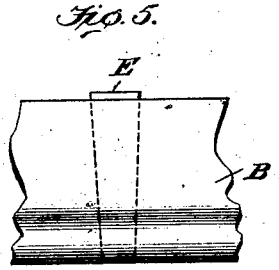
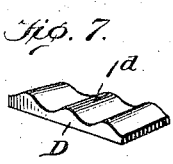
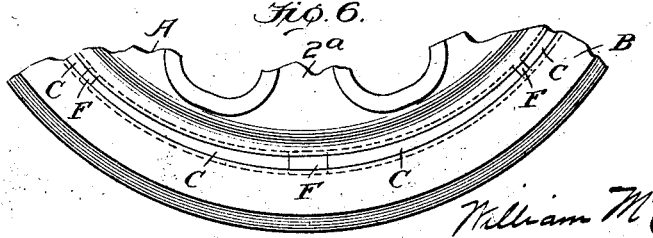
Witnesses
Edwin L. Bradford
Inventor
William McConway
By F. W. Ritter, Jr.
Attorney

UNITED STATES PATENT OFFICE.

WILLIAM McCONWAY, OF PITTSBURG, PENNSYLVANIA.

CAR-WHEEL.

No. 929,321.  Specification of Letters Patent.  Patented July 27, 1909.

Application filed November 7, 1908. Serial No. 461,542.

*To all whom it may concern:*

Be it known that I, WILLIAM McCONWAY, a citizen of the United States, residing at Pittsburg, in the county of Allegheny and State of Pennsylvania, have invented certain new and useful Improvements in Car-Wheels; and I do hereby declare the following to be a full, clear, and exact description of the invention, such as will enable others skilled in the art to which it appertains to make and use the same.

My invention relates to the manufacture of wheels for vehicles, and is particularly directed to the production of a wheel which is especially fitted to efficiently fulfil the severe requirements of strength and durability imposed upon wheels for railway cars.

In accordance with my invention, a wheel center and a tire or tread section are connected and maintained in proper relation by means of interposed circumferentially extending wedges the direction of taper of some of which is opposed to the direction of taper of others, and such a construction embodies the principal feature of my invention.

There are other, minor, features of invention, residing in particular combinations and elemental constructions, all as will hereinafter more fully appear.

In practice it is preferred to employ a rolled steel tire and a cast steel wheel center, as a wheel having a long life in service is thereby produced, but it is to be understood that the invention is not limited to the use of the materials suggested, since it is equally applicable when the parts are formed of other materials.

In the drawings chosen for the purpose of illustrating my invention, the scope whereof is pointed out in the claims, Figure 1 is a side view of a car wheel embodying my invention; Fig. 2 is a vertical section taken in the plane of the line 2—2, Fig. 1, Fig. 3 is a detail sectional view taken in the plane of the line 3—3, Fig. 4, Fig. 4 is a detail view in side elevation showing one of the sets of fillers and wedges by which the wheel center and tire are initially connected, Fig. 5 is a detail plan view showing the relation of the fillers and wedge illustrated in Fig. 4, Fig. 6 is a fragmentary view in side elevation showing a completed car wheel in which the fillers and wedges have been withdrawn and the spaces occupied thereby filled with molten material; and Fig. 7 is a detail perspective view of one of the fillers.

Like symbols refer to like parts wherever they occur.

I will now proceed to describe my invention more fully, so that others skilled in the art to which it appertains may apply the same.

In the drawings, A is a wheel center which is formed with a suitable hub $1^a$ located at the center thereof. The web $2^a$ of the wheel center has its peripheral surface preferably formed otherwise than as a ruled surface, for example as a corrugated surface $3^a$.

The tire or tread section B of the wheel has its inner circumferential surface $1^b$ likewise formed to interlock with those devices which are interposed between it and the wheel center A, corrugations such as shown being very effective for this purpose. The opening within the tire section B is sufficiently larger than the center member A to provide an annular space between these two parts, such annular space being of variable cross section and consisting of a series or succession of wedge like spaces each of which has its taper opposed to the direction of taper of the immediately adjacent wedge like spaces. The series of circumferentially extending wedge like spaces may be formed by fashioning the peripheral surface of the wheel center A or the inner circumferential face of the tire B, or both such surfaces, with curved surfaces which are eccentric with respect to each other. In the drawings the wheel center alone is shown as provided with the curved eccentric surfaces, the elements of the inner circumferential face of the tread section B being circular. Such a construction is of particular utility when the wheel center is a casting and the tire is formed by rolling, as the curved eccentric faces may be more readily formed by casting than by rolling.

For the purpose of securing the tire B to the wheel center A in proper relation to permit the circumferentially extending locking members or wedges C to be cast between them, several equally spaced sets of fillers D and wedges E are preferably employed. These fillers and wedges are all similar in construction, but are made in sizes to fit the widest and narrowest portions of the annular space between the wheel center and tire, as will be readily understood from an examination of Fig. 1 of the drawings. Each filler block D has a corrugated or otherwise formed face $1^d$ corresponding to the form of the peripheral face of the wheel center A or inner circumferential face of the tread section B, according as it engages one or the other of these members. Each filler is also preferably tapered in two directions, that is to say, each filler is preferably formed so that it is thicker at one end that at the other, the sides which are presented to the ends of the circumferential wedges C being convergent toward such thicker end. Each wedge E is also preferably tapered in two directions toward one of its ends. The double tapered construction of fillers D and wedges E is more particularly exhibited in Figs. 3, 4, 5 and 7 of the drawings.

To secure the tire B to the wheel center A prior to casting the curved wedges C, fillers D are inserted, as shown in Fig. 1, in pairs in the annular space between said members A and B, the respective corrugated or otherwise suitably formed faces of the fillers engaging the correspondingly shaped surfaces of the wheel center and tire, and the thicker ends of each of said fillers being placed adjacent to each other so that the space between them will receive and conform to the wedge E. When the wedges E are driven between the oppositely arranged fillers D the latter are forced into intimate interlocking contact with the tire B and wheel center A, thus securing these two principal parts in the relation they occupy in the completed wheel.

After the wheel center and tire have been secured to each other by means of the fillers D and wedges E, molten metal or other suitable material is poured into each of the tapering segmental spaces bounded by the tire, wheel center and adjacent sets of fillers and wedges. The molten material when cooled forms a series of curved locking wedges C lying between the wheel center A and tire B and conforming to the configuration of the adjacent faces of said members A and B.

After the wedges C have been cast between the tire and wheel center, as heretofore described, all of the fillers D and wedges E are removed, such removal being readily effected by reason of the double taper with which each of these members is formed. The curved wedges C are then forced or driven in a circumferential direction until each is in intimate contact with the wheel center and tire, any looseness due to the shrinkage of the cast wedges C being thus taken up. The wedges C, which have inclined ends as a result of being cast against the fillers D and wedges E, may be conveniently forced in a circumferential direction by driving suitably proportioned wedges into the spaces left between the thicker ends of each oppositely tapered pair by the withdrawal of the said fillers D and wedges E, the spaces left between the adjacent thinner ends of the circumferentially extending wedges affording sufficient clearance to permit such wedges to be driven into intimate contact with the periphery of the wheel center and the inner circumferential surface of the tire.

When intimate contact of the curved wedges C with the wheel center A and tire B has been effected, the spaces remaining between the thinner ends of such wedges C may be permanently filled with properly proportioned wedges, but it is preferred to withdraw the wedges employed for driving the members C circumferentially and fill all remaining spaces between the tire and wheel center with molten material, as at F, F, Fig. 6, thus in effect forming a continuous annular cast metal locking member which is in intimate contact both with the wheel center A and tire or tread section B of the wheel.

Having thus described my invention, what I claim and desire to secure by Letters Patent is:

1. A car wheel comprising a wheel center having a curved peripheral face the circumferential elements of which consist of eccentric arcs, a tire, and wedges connecting said tire to said wheel center, the direction of taper of some of said wedges being opposed to the direction of taper of others.

2. A car wheel comprising a wheel center, a tire, and wedges connecting said wheel center and tire, said wedges being arranged in pairs having their thicker ends adjacent to each other.

3. A car wheel comprising a wheel center, a tire which is larger than the wheel center and forms therewith a series of wedge like spaces each of which tapers in a different direction from the taper of its immediately adjacent spaces, and wedges located in the wedge like spaces between the wheel center and tire and connecting said tire to said wheel center.

4. A car wheel comprising a wheel center, a tire, circumferentially extending wedges connecting said tire and wheel center, the direction of taper of some of said wedges being opposed to the direction of taper of others, and independent wedges separating said circumferentially extending wedges.

5. A car wheel comprising a wheel center, a tire, and wedges connecting said members, said wheel center and tire being formed with continuously curved faces which interlock with said wedges.

6. As a means for connecting a wheel center to a tire prior to casting locking members between them, the combination with separable fillers adapted to engage and interlock with the wheel center and tire respectively, of an interposed wedge for separating said fillers.

7. As a means for connecting a wheel center to a tire prior to casting locking members between them, the combination of separable fillers which are tapered in two directions, and an interposed wedge which is tapered in two directions.

8. A wheel center for car wheels, said center having a peripheral face consisting of a series of eccentric surfaces which are connected to form a continuous curved surface, the circumferential elements of said curved surface consisting of eccentric arcs.

In testimony whereof I affix my signature, in presence of two subscribing witnesses.

WILLIAM McCONWAY.

Witnesses:
J. W. HARTLEY,
F. D. ECKER.